Aug. 22, 1939.   J. A. RAYNOLDS, JR   2,170,520
METHOD OF PRODUCING MOLDED PRODUCTS
Filed Jan. 19, 1937   2 Sheets-Sheet 1
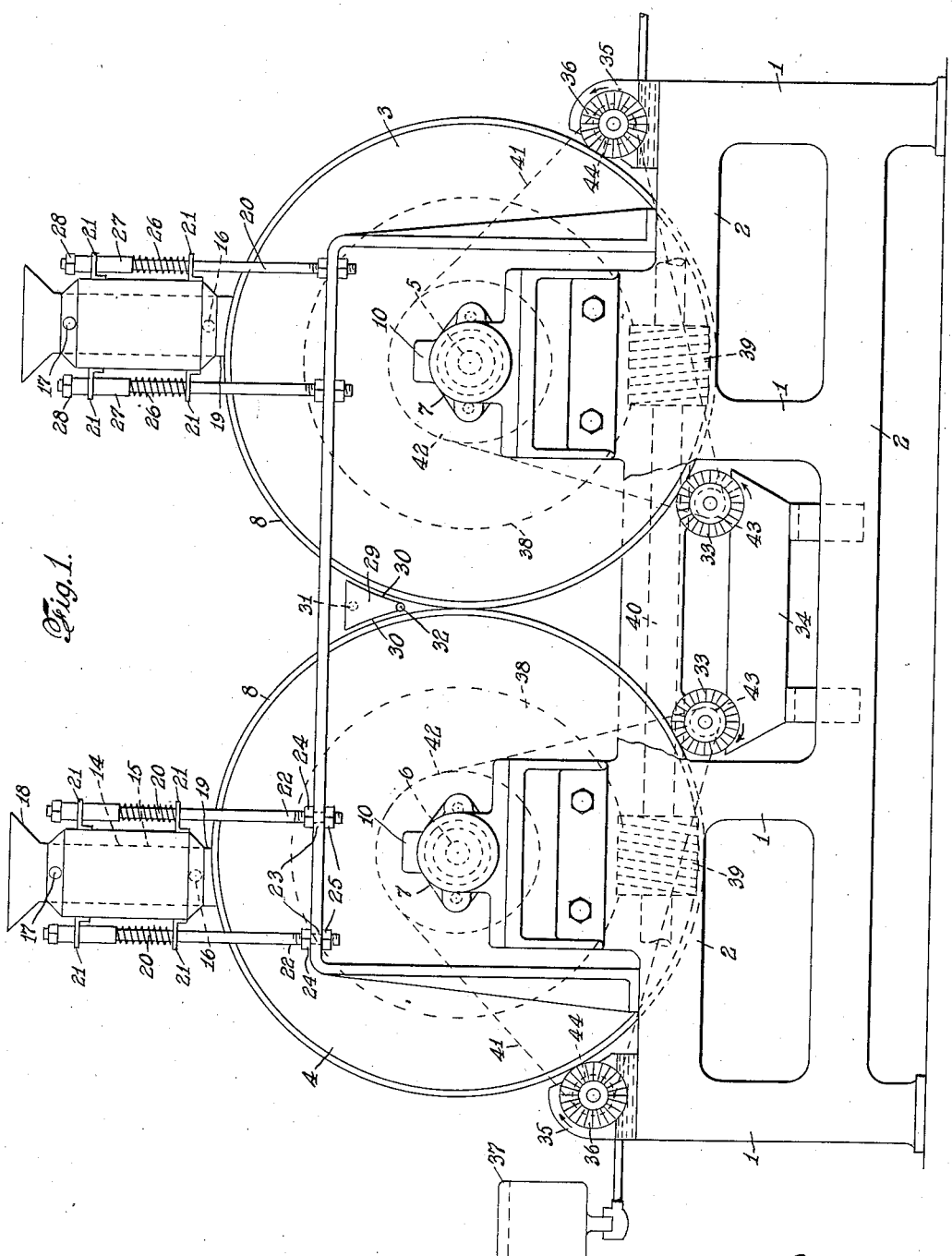

Aug. 22, 1939.　　　J. A. RAYNOLDS, JR　　　2,170,520
METHOD OF PRODUCING MOLDED PRODUCTS
Filed Jan. 19, 1937　　　2 Sheets-Sheet 2
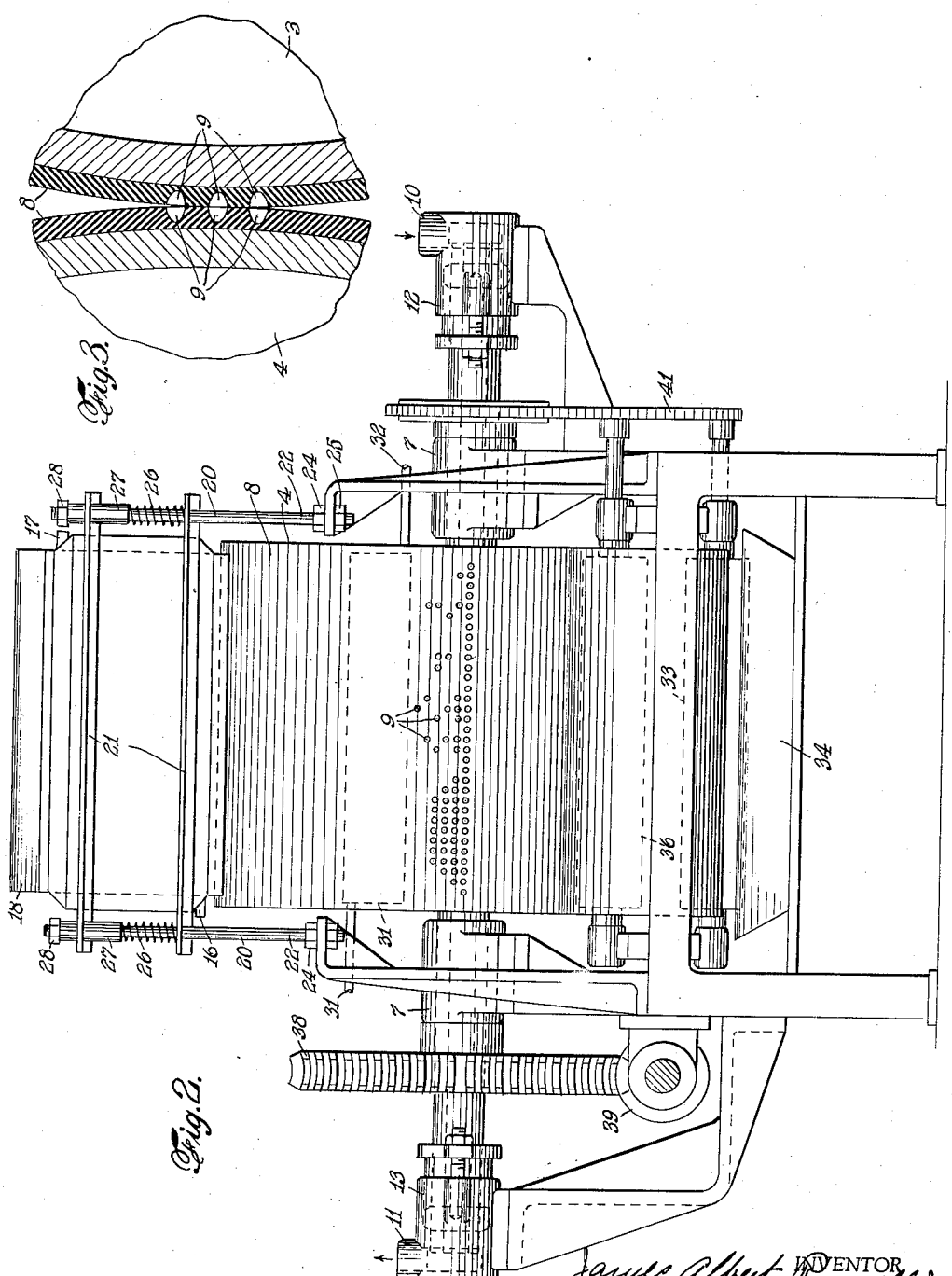
INVENTOR
James Albert Raynolds Jr
BY
Wm. S. Pritchard
ATTORNEY.

Patented Aug. 22, 1939

2,170,520

UNITED STATES PATENT OFFICE 2,170,520

METHOD OF PRODUCING MOLDED PRODUCTS

James Albert Raynolds, Jr., Elmhurst, N. Y., assignor to The Atlantic Coast Fisheries Company, New York, N. Y., a corporation of Maine Application January 19, 1937, Serial No. 121,281

3 Claims. (Cl. 107—54)

This invention relates to a method for making molded products in the form of spheres, spheroids, ovoids and similar shapes. More specifically, the invention relates to a method of and apparatus for preparing spherical, spheroidal, ovoidal and similarly shaped articles for pharmaceutical and other purposes, and comprising a colloidal matrix having dispersed therein a vitamin-bearing liquid, the vitamin-bearing liquid being completely enveloped and imprisoned by the colloidal matrix so that there is no free vitamin-bearing liquid on the surface of the product.

The nature and objects of the invention will become clear and apparent from the following description, appended claims and accompanying drawings forming a part of this specification and wherein:

Figure 1 is a side elevation of one embodiment containing the principles of the invention;

Figure 2 is an end view of the apparatus illustrated in Figure 1; and

Figure 3 is a fragmentary detail in section illustrating one of the important features of the invention.

Though, as will hereafter appear, the invention is capable of use with various compositions, for the sake of brevity and convenience an illustrative embodiment thereof will be described in connection with the production of articles of the previously-mentioned type composed of gelatin having dispersed therein a vitamin-bearing liquid, the particles of the vitamin-bearing liquid being completely enveloped and imprisoned by the gelatin.

Broadly, the invention contemplates producing corresponding shaped semi-spherical, semi-spheroidal, semi-ovoidal or other similarly shaped articles, hereafter called "half-portions", of the selected composition. Thereafter corresponding shaped half-portions are united to form spherical, spheroidal, ovoidal or similarly shaped products.

The preferred form of apparatus consists of two hollow metal drums, each of which is provided with an elastic or yielding facing in which are formed suitably shaped cavities of the desired shape and size. The two drums are arranged tangent to each other and preferably so mounted that the yielding facings exert a moderate pressure at the place of tangency, with the result that a plane of tangency is secured. The molding cavities in the yielding, elastic material on the drums are arranged so that, when the drums pass through the plane of tangency, the cavities on one drum will be in registry and in alignment with correspondingly shaped cavities in the other drum at and during the plane of tangency.

The drums revolve in opposite directions in such a manner that a point at the top of the drums moves towards the plane of tangency.

The composition of which the product is composed is preferably applied at an elevated temperature to the molding cavities on each drum. The drum is provided with means to chill it so that the composition sets to form a firm gel. After the composition in the molding cavities on each drum has set to a firm gel, the exposed surfaces of corresponding half-portions, while in the cavities, are subjected to an operation whereby said exposed surfaces are modified so that, when said corresponding half-portions are pressed together, one will adhere to the other. The half-portions, with the surfaces modified as just described, upon continued rotation of the drum, pass through the plane of tangency, with the result that they are caused to tenaciously adhere to one another, forming the desired shaped product.

After the uniting of two corresponding shaped half-portions, the continued rotation of the drum causes the product to be removed from one of the molding cavities. The product is finally removed from whichever drum it may be in by suitable means.

To facilitate and effect clean removal of the products in either the finished or semi-finished state so that there will be no broken or injured surfaces, a lubricant is applied to the molding surface prior to the application of the composition to be molded.

The gelatin emulsion is of the type and nature and composition as set forth in copending application Serial No. 105,086. This emulsion is prepared by disolving gelatin in warm water to produce a solution of fairly high concentrations, such as 30% to 50% by weight of dry gelatin. To this solution of gelatin, while at an elevated temperature and still liquid, is added, if desired, a plasticizer such as glycerin, glucose, etc. in sufficient quantity to prevent the final product from being too hard and too brittle and to impart the desired degree of softness or elasticity in the final product. In this resulting warm solution of gelatin there is emulsified the vitamin-bearing liquid so that there results an emulsion wherein the gelatin solution constitutes the continuous phase and the vitamin-bearing liquid constitutes the dispersed phase. The water in which the gelatin is dissolved is previously treated, such as by boiling, to remove or expel the oxygen dissolved therein.

To make sure that no oxidizing substances exist in the gelatin phase, a reducing substance sufficient to reduce such oxidizing agents may be dissolved in the latter. For this purpose, I find vitamin C, otherwise known as ascorbic or cevitamic acid, to be suitable. If vitamin C is added in excess of the amount required to reduce all oxidizing substances in the gelatin solution, then, of course, the unoxidized excess becomes a therapeutic agent itself. The amount and potency of the vitamin-bearing liquid emulsified in the gelatin solution is based on the potency and liquid content desired in the final product. It is, of course, to be understood that the quantity of oil must be low enough to be wholly dispersed in the gelatin solution without becoming a continuous phase and without exuding the liquid oil in the later stages of the process.

Referring now to the drawings, the reference numerals 1 and 2 designate the vertical and horizontal members respectively of a frame on which the apparatus, more fully explained hereafter, is mounted. The frame may be formed of any suitable materials, such as cast iron, metal or the like, and which may be supported on a suitable foundation. The drums 3 and 4 are mounted on shafts 5 and 6, respectively, rotatably mounted in bearings 7 carried by the frame.

The drums 3 and 4 are hollow and are formed of a material which has a high coefficient of heat transfer. The peripheral surface of each drum is provided with a covering or facing 8 of an elastic or yielding material, such as, for example, soft vulcanized rubber. Each facing 8 is provided with shaped molding cavities 9 so arranged that those on drum 3 will be in registry and alignment with corresponding shaped molding cavities 9 on drum 4 when they pass through the plane of tangency, as shown in Figure 3. The molding cavities 9 are semi-spherical, semi-spheroidal, semi-ovoidal or similarly shaped and of any desired size. In the form illustrated in Figure 3, the molding cavities 9 are, for illustrative purposes, shown as semi-ovoids.

Each of the shafts 5 and 6 is hollow and is provided with an inlet 10 and an outlet 11, whereby an appropriately pre-cooled or chilled fluid may be passed through the interior of the drum, with the consequence that the shell of the drum is chilled or cooled to the desired temperature. Stuffing boxes 12 and 13 of any known type are provided so that there will be fluid-tight joints at the inlets 10 and the outlets 11.

The two drums 3 and 4 are mounted so that they are tangent to each other. Preferably the drums 3 and 4 are so mounted that the elastic and yielding facings 8 exert a moderate pressure on each other, with the result that a plane of tangency, as shown in Figure 3, is obtained. The drums 3 and 4 are rotated in opposite directions in such a manner that a point at the top of the drums moves towards the plane of tangency.

Each of the drums 3 and 4 is provided with means to apply the composition which is to be molded. Various applying means may be employed. In the embodiment of the invention illustrated, the applying means comprises a hopper 14. Due to the fact that the composition to be applied is to be at an elevated temperature, the hopper 14 is provided with a jacket 15 having an inlet 16 and an outlet 17, whereby a heating fluid, such as steam, may be circulated through the jacket. The hopper is provided with a flared inlet 18 through which the composition may be introduced into the hopper. If desired, a suitable cover may be provided. The lower end of each hopper 14 is open and the drum cooperating therewith passes thereunder. The front wall 19 of the hopper constitutes a squeegee and, in the form illustrated, it is positioned in line with the vertical axis of the drum. It is to be understood that the hopper 14 may be positioned at some other convenient place. If desired, a squeegee (not shown) may be provided in advance of the hopper 14.

Instead of making the squeegee 19 an integral part of the front wall of the hopper 14, a slide member functioning as a squeegee may be adjustably, movably and resiliently mounted on the hopper in any well-known manner or as will be apparent to one skilled in the art.

The hopper 14 is mounted on the frame through the medium of posts 20 passing through and cooperating with holes in brackets 21 secured at appropriate positions to said hopper. In the form illustrated, there are four brackets 21, two of which are secured to one side of the hopper 14 adjacent the top and bottom thereof, the other two being similarly secured at corresponding places to the opposite side of the hopper. As shown, each of the brackets 21 ends beyond the hopper and the extensions are provided with aligned holes through which the posts 20 pass. Each of the lower ends 22 of the posts 20 is movably mounted in the frame so that the posts can be moved in a vertical direction whereby the hopper may be raised or lowered. Various means may be employed for movably mounting the posts 20 to the frame. In the form illustrated, the lower portion 22 of the post 20 is threaded and passes through the frame, as at 23, the thread portion cooperating with nuts 24 and 25. It is clear that, in order to raise and lower the posts 20, the nuts 24 and 25 are loosened and the posts turned in the proper direction. When the nuts 24 and 25 are in their screwed-home condition, the posts 20 are locked and cannot have or be given any vertical movement.

In the preferred embodiment of the invention, the hoppers 14 are also yieldingly and resiliently mounted with respect to the drums 3 and 4. Though this can be secured in various ways, in the form illustrated it is obtained at each post through the medium of a spring 26, the lower end of which cooperates with the lower bracket 21, and the upper end of which cooperates with the lower end of a sleeve 27 on the upper portion of the post 21, which is threaded. A nut 28 on the threaded portion of post 20 cooperates with the upper end of sleeve 27. Upon rotation of the nut 28, the tension of the spring may be increased or decreased, whereby the hopper may be accurately adjusted with respect to the drums.

As previously explained, the invention contemplates forming predetermined shaped half-portions in each drum and then securing corresponding shaped half-portions to produce spherical, spheroidal, ovoidal or like products. In order to cause the adherence of the two corresponding shaped half-portions, the exposed cross-sectional surfaces of the corresponding shaped portions, while in the molding cavities, are so modified that when they are brought in contact with each other, at least during the plane of tangency between the two drums 3 and 4, they will adhere to each other. Various means may be employed for modifying the cross-sectional exposed surfaces of the masses. For convenience and facility in operation, I prefer to modify the surface by rendering the same plastic or soft whereby, upon pressure, they can be united. In the preferred embodiment of this invention, I secure the desired results by positioning a heater 29 immediately prior to the plane of tangency where the corresponding shaped half-portions come in contact with each other. The heater 29, in the form shown, consists of an elongated chamber, the side walls 30 of which are arcuately shaped to conform to the curved surface of the drum and to permit the heating unit to be placed in close proximity thereto. The heater is heated by passing steam of desired temperature therethrough, and for this purpose the heating unit is provided with an inlet 31 and an outlet 32. It is to be understood that the invention is not restricted to the precise heating unit just described. If desired, the heater may be electrically heated, or some other form of heater may be used. If desired, only the surfaces of the half-portions on one drum may be modified.

When, for example, fixed points of the drums pass through at least the plane of tangency, the half-portions will be caused to adhere to each other. In actual practice it has been found that after the uniting of the half-portions one of the half-portions will be withdrawn from its molding cavity. It cannot be definitely determined which half-portion will be removed from its cavity. Thus, upon continued rotation of the drums, each of them may have united products therein. Means are, therefore, provided to cooperate with each of the drums so as to remove the completely united article. In the form shown, this is secured by means of rotating brushes 33. These brushes are resiliently mounted and rotated in a direction opposite to the drum with which it cooperates. As any portion of the drum engages the brushes, the products in the cavities will be removed therefrom and collected in a suitable collection device 34 disposed beneath the brushes 33 and carried on the frame in any convenient manner.

In order to facilitate easy removal of the material from the molding cavities both at the time when the two half-portions are joined together and also by means of the brushes 33, a lubricant is applied to the facing and molding cavities prior to the application thereto of the composition to be molded. The lubricant is of a nature which does not deleteriously affect the product, the elastic facing on the drum, or in any way interfere with the operation of the apparatus. Various substances may be utilized for this purpose. I have found that oils, such as castor oil and other hydroxylated oils, are admirably suited for this purpose.

The lubricant, previously described, is applied to the drum at any convenient point in its path of travel prior to the application of the molding composition. In the form illustrated, the lubricant is supplied to a vessel 35 in which a brush 36 rotates in a direction opposite to the direction of the drum with which it cooperates, the amount of lubricant in the vessel being such that the lower portion of the brushes are immersed therein, and as it rotates it applies a lubricant on the surface of the drum. The level of the lubricant in the vessel 35 is maintained at its desired height in any well-known manner as, for example, a barometric feed 37.

When a lubricant is used after the products are collected, they are subjected to a washing with an appropriate solvent to remove any adhering lubricant.

Though the invention has been specifically described in connection with the production of spherical, spheroidal, ovoidal or similarly shaped products comprising a gelatin matrix containing the vitamin-bearing liquid dispersed and imprisoned therein, it is to be understood that the invention is equally applicable to the production of similarly shaped materials in which the matrix may be formed of any colloidal substance. Likewise, the invention is applicable to any composition which sets upon cooling and which can be molded as herein described, such as, for example, candy, cosmetics, plastics, etc.

The various moving parts of the apparatus may be synchronized and driven by any suitable mechanism. For example, the drums 3 and 4 may be driven through the medium of gears 38 cooperating with worms 39 on a shaft 40 driven by any suitable means, such as a motor (not shown). The brushes 33 and 36 cooperating with their respective drum may be driven by means of a sprocket chain 41 trained over sprockets 42, 43 and 44 carried by the shafts of the drum 3 or 4, brush 33 and brush 36.

To operate the apparatus and carry out the method, the drums 3 and 4 are rotated and the lubricant applied by brush 36. Cooled or prechilled fluid is passed through the interior thereof. Each hopper is adjusted with respect to its respective drum. The composition to be molded is introduced into the hopper and, as the drums rotate, the composition is applied to the molding cavities. The front walls of the hoppers function as squeegees and remove excess composition and fill the cavities. Immediately upon the introduction of the composition, due to the fact that the drum is in a chilled state, it begins to set. After the composition has set to form a firm gel, it passes adjacent the heater 29 whereby the exposed surfaces of the half-portions are modified and rendered adhesive. Continued rotation of the drums causes the half-portions to pass through the plane of tangency whereby the half-portions are united. As the drums rotate and leave the plane of tangency, one half-portion is removed from its molding cavity by the other half-portion to which it is united. As the drums continue rotation, the brushes 33 remove the product and the latter is received in the collection vessel 34. The products are then washed to remove any adhering lubricant.

The drums are preferably continuously rotated, though, if desired, they may be intermittently rotated. The size of the drums is such that the composition will be in a sufficiently set condition prior to exposure to the heat of the heaters 29.

Since it is obvious that various changes and modifications may be made in the above description without departing from the nature or spirit thereof, this invention is not restricted thereto except as set forth in the appended claims.

I claim:

1. A method of continuously making substantially solid articles composed of a colloidal matrix having a vitamin-bearing liquid dispersed and imprisoned therein which comprises introducing an emulsion in which a colloidal matrix constitutes a continuous phase and a vitamin-bearing liquid constitutes the disperse phase into molding cavities to form corresponding half-portions of the desired shape, chilling the emulsion in the molding cavities so that it will form a firm gel, rendering the cross-sectional surfaces of said gelled half-portions adhesive while in the molding cavities, and securing the corresponding half-portions together.

2. A method of continuously making substantially solid articles which comprises introducing a composition which solidifies on cooling into molding cavities to form corresponding half-portions of the desired shape, chilling the composition in molding cavities to solidify the same, rendering the cross-sectional surfaces of said solidified half-portions adhesive while in the molding cavities, and securing the corresponding half-portions together.

3. A method of continuously making substantially solid articles which comprises applying a composition which solidifies on cooling to molding cavities on surfaces moving in opposite directions toward a point where the surfaces will be tangent to each other to form corresponding half-portions of the desired shape, chilling the composition on said surfaces to solidify the same, rendering the cross-sectional surfaces of said solidified half-portions adhesive prior to the point of tangency and while in the molding cavities, and securing the corresponding half-portions together at the point of tangency.

JAMES ALBERT RAYNOLDS. Jr.